(12) United States Patent
Franco et al.

(10) Patent No.: US 9,561,498 B2
(45) Date of Patent: Feb. 7, 2017

(54) PROCESS FOR THE DIRECT SYNTHESIS OF CU-SAPO-34

(75) Inventors: Raquel Martinez Franco, Manises (ES); Manuel Moliner Marin, Valencia (ES); Avelino Corma Canós, Valencia (ES); Arkady Kustov, Frederiksberg C (DK); Joakim Reimer Thøgersen, Virum (DK)

(73) Assignee: Haldor Topsoe A/S, Lyngby (DK)

( * ) Notice: Subject to any disclaimer, the term of this patent is extended or adjusted under 35 U.S.C. 154(b) by 193 days.

(21) Appl. No.: 14/395,872

(22) PCT Filed: Apr. 27, 2012

(86) PCT No.: PCT/EP2012/057817
§ 371 (c)(1),
(2), (4) Date: Oct. 21, 2014

(87) PCT Pub. No.: WO2013/159828
PCT Pub. Date: Oct. 31, 2013

(65) Prior Publication Data
US 2015/0110711 A1  Apr. 23, 2015

(51) Int. Cl.
| C01B 39/54 | (2006.01) |
| B01J 29/85 | (2006.01) |
| C01B 37/08 | (2006.01) |
| B01D 53/86 | (2006.01) |
| B01J 37/08 | (2006.01) |

(52) U.S. Cl.
CPC ............ *B01J 29/85* (2013.01); *B01D 53/8628* (2013.01); *B01J 37/08* (2013.01); *C01B 37/08* (2013.01); *C01B 39/54* (2013.01); *B01D 2255/50* (2013.01); *B01D 2257/404* (2013.01); *B01J 2229/183* (2013.01)

(58) Field of Classification Search
CPC ....... C01B 39/54; B01J 29/85; B01J 2229/183
See application file for complete search history.

(56) References Cited

U.S. PATENT DOCUMENTS

| 2010/0310440 | A1* | 12/2010 | Bull ................... B01J 20/186 423/239.1 |
| 2013/0266785 | A1* | 10/2013 | Chen .................. B01J 20/18 428/219 |
| 2014/0161718 | A1* | 6/2014 | Qi ...................... B01D 53/9418 423/708 |
| 2015/0110711 | A1* | 4/2015 | Franco ............... B01J 29/85 423/703 |
| 2015/0203417 | A1* | 7/2015 | Tian .................... C10G 3/45 585/733 |
| 2015/0218007 | A1* | 8/2015 | Chen .................. B01J 20/18 428/402 |
| 2015/0298983 | A1* | 10/2015 | Maurer .............. C01B 39/02 423/709 |

FOREIGN PATENT DOCUMENTS

| EP | 2 269 733 A1 | 1/2011 |
| EP | 2 724 983 A1 | 4/2014 |
| JP | 2013-220969 A | 10/2013 |
| RU | 2009 139 228 | 5/2011 |
| WO | WO 2008/118434 A1 | 10/2008 |

OTHER PUBLICATIONS

L. Ren et al., "Designed Copper-Amine Complex as an Efficient Template for One-Pot Synthesis of Cu-SSZ-13 Zeolite with Excellent Activity for Selective Catalytic Reduction of $No_x$ by $NH_3$", Chemical Communications, vol. 47, No. 35, Jan. 1, 2011, pp. 9789-9791.
R. Martinez-Franco et al., "Rational Direct Synthesis Methodology of Very Active and Hydrothermally Stable Cu-SAPO-34 Molecular Sieves for the SCR of $No_x$", Applied Catalysis B, Environmental, vol. 127, Oct. 1, 2012, pp. 273-280.
U. Deka et al., "Changing Active Sites in Cu-CHA Catalysts: $deNO_x$ Selectivity as a Function of the Preparation Method", Microporous and Mesoporous Materials, vol. 166, Jan. 1, 2013, pp. 144-152.

* cited by examiner

*Primary Examiner* — David M Brunsman
(74) *Attorney, Agent, or Firm* — Blank Rome LLP

(57) ABSTRACT

A process for the direct synthesis of Cu-SAPO-34 comprising at least the steps: preparation of a mixture of water, at least one silicon source, at least one Al source, at least one P source, at least one Cu source, at least one OSDA1 (any polyamine), and at least one OSDA2 source (where OSDA2 is any organic molecule capable of directing the synthesis of SAPO 34); and where the final synthesis mixture has the molar composition: a Si:0.5 Al:c Cu:d OSDA1:e OSDA2:f H2O wherein a is in the range from 0.01 to 0.3; b is in the range from 0.2 to 0.49; c is in the range from 0.001 to 0.6; d is in the range from 0.001 to 0.6; e is in the range from 0.001 to 2; f is in the range 1 to 200; hydrothermal treatment of the mixture at 80–200° C. until formation of the crystalline material, and recovery of the crystalline material.

10 Claims, 3 Drawing Sheets

PXRD patterns of the as-prepared and calcined form of Cu-SAPO-34 of Example 54

SEM image of Cu-SAPO-34 of Example 54

UV-Vis spectra of Cu-TEPA complex in solution (a), and as-prepared Cu-SAPO-34 of Example 54.

FIGURE IV: PXRD patterns of the as-prepared and calcined form of Cu-SAPO-34 of Example 58.

SEM image of Cu-SAPO-34 of Example 58.

UV-Vis spectrum of as-prepared Cu-SAPO-34 of Example 58

PROCESS FOR THE DIRECT SYNTHESIS OF CU-SAPO-34

This application is a 371 filing of PCT/EP2012/057817, filed Apr. 27, 2012.

The present invention relates to a new procedure for the manufacture of the silicoaluminophosphate molecular sieve SAPO-34 containing copper atoms by a direct synthesis methodology. This procedure involves the combination of a copper-polyamine complex molecule and an additional organic molecule together with the silicon, aluminium and phosphorous sources required in a typical SAPO preparation. The additional organic molecule is required to direct the SAPO-34 crystallization, controlling the loading of Cu in the final solid. The present invention also relates to the method of use of the Cu-SAPO-34 materials synthesized by using this cooperative structure directing agent procedure, as catalysts for the selective catalytic reduction (SCR) of NOx.

Aluminophosphate (AlPOs) zeotypes were first described by UOP researchers in 1982 (Wilson, S. T., et al. J. Am Chem. Soc. 1982, 104, 1146). The framework composition of those materials is formed by Al and P atoms under a strict alternation in tetrahedral coordination, connected by O atoms. Silicoaluminophosphates (SAPOs) are a particular case of AlPOs, where some of the framework atoms are partially substituted by silicon (Chen, J. S. et al. J. Phys. Chem., 1994, 98, 10216). This substitution can occur by two different mechanisms: a) replacement of P by Si atoms, generating a negative charge in the framework, or b) coupled replacement of Al and P by two Si atoms, resulting in the formation of silicon islands. In both cases, but preferably in the first case, SAPO materials show an excellent cation exchange capacity which permits the presence of different active species for several catalytic applications. Possibly, the most common SAPOs are in the protonated form. The protons associated with the Si framework substitutions introduce acidity to those materials, which allows their application as commercial catalysts in acid catalytic processes, such as methanol-to-olefins synthesis (S. W. Kaiser, U.S. Pat. No. 4,499,327; 1985).

Other cations, different to protons, can be introduced in SAPO materials. Conventionally, these metal-containing SAPOs (Me-SAPOs) are achieved by post-synthetic metal ion-exchange procedures. Indeed, several steps are required to achieve the Me-SAPO material, such as hydrothermal synthesis of SAPO, calcination, transformation to NH4-form if required, metal ion exchange, and finally, calcination to get the final Me-SAPO. All those steps contribute to increase the cost of the Me-SAPOs.

Recently, the preparation of the Cu-substituted zeotypes, and particularly small pore zeotypes containing large cavities in their structure, has received a significant attention by its extraordinary behavior in the selective catalytic reduction (SCR) of nitrogen oxides (NOx) with ammonia or hydrocarbons in the presence of oxygen. In this sense, the formation of NOx during the combustion of fossil fuels, especially from transportation, has overcome as one serious environmental problem. The better catalytic behavior for SCR of NOx of Cu-substituted small pore zeolites has been recently elucidated by Lobo et al. (J. Phys. Chem. C., 2010, 114, 1633). They found that extra-framework cationic copper inside of large cavities and coordinated to special cages (double 6 member rings, D6-MR) is the main reason for their better activity and thermal stability.

SAPO-34 is a silicoaluminophosphate molecular sieve with the CHA structure, which is formed by a three-directional small pore system (8-MR) containing large cavities with D6-MR in its structure.

Ishihara et al. reported a Cu-exchanged SAPO-34 as a very stable and active catalyst for SCR of NOx with hydrocarbons (Ishihara, T. et al. J. Catal., 1997, 169, 93). Other examples found in the literature describing Cu-exchanged SAPO-34 as an efficient catalyst for SCR of NOx are "US 2008/0241060" or "WO 2008/132452".

However, as it has been described above, "one-pot" synthesis procedures are highly demanded by the industry in order to reduce considerably the economy of the overall Me-SAPO synthesis procedure.

There are several examples in the literature where Me-SAPOs or Me-AlPOs materials were synthesized by a direct form (for example Wright, P. A. et al. J. Chem. Soc., Chem. Commun. 1993, 633, or Wright, P. A. et al., J. Chem. Soc., Dalton Trans., 2000, 1243). In those cases, the metal source was added in the synthesis gel with the other required sources for the SAPO or AlPO preparation, and finally, metal atoms were primarily in the framework of those solids. This occurs because of the favorable framework substitution of Me2+ for Al3+, creating a negatively charged structure which permits ion exchange.

This direct synthesis procedure has been applied also for the preparation of Cu-SAPO-34 materials. In those reports, a mixture of metal in framework positions, in extra-framework cationic positions and also metal oxide forms were present in the final solid (see Palella et al., J. Catal. 2003, 217, 100; Frache et al. Stud. Surf. Sci. Catal. 2001, 135, 328; Frache et al. Stud. Surf. Sci. Catal. 2001, 140, 269 or Bull, I. et al. EP 2,269,733 A1, 2011). In all those examples, morpholine was used as organic molecule, and CuO was added in the synthesis gel as Cu source at very low ratios [Cu/(Al+P) less than 0.05]. Depending on the Cu amount, dilution and synthesis temperature (higher than 170° C. in all cases), pure Cu-SAPO-34 or mixture of phases were achieved. The last report on the direct preparation of Cu-SAPO-34 following the described morpholine methodology has been presented by BASF researchers (Bull, I. et al. EP 2,269,733 A1, 2011). In this patent, they followed a similar synthesis procedure than previous reports (see Palella et al., J. Catal. 2003, 217, 100; Frache et al. Stud. Surf. Sci. Catal. 2001, 135, 328; Frache et al. Stud. Surf. Sci. Catal. 2001, 140, 269), and they claimed a lower crystallization time (30 hours of synthesis instead of previous reported 7 days) for the Cu-SAPO-34 preparation, and a higher yield (70%) and selectivity towards the final solid, obtaining a cost-saving synthesis process. From the described examples in that patent, the optimum Cu-SAPO-34 is the "Example 4", where the final copper content in the solid is Cu/(Al+P)=0.02. When the Cu content in the final solid is increased [see "Example 6" with a Cu/(Al+P)=0.042], a greater amount of amorphous material is obtained (see point 6.4 of the patent EP 2,269,733 A1). In the "Claims" section, they claimed in "Claim 1" a general range of Cu/(Al+P) between 0.0075-0.18, and in "Claim 15" a particular range of Cu/(Al+P) between 0.016-0.11, when an organic structure directing agent (preferably morpholine, tetraetylammonium hydroxide, piperidine, or tetraethylammonium chloride) is used. Those claims clearly overcome the results showed in the different examples of the patent.

Xiao et al. have recently described the use of a copperamine complex as an efficient template for the direct preparation of Cu-SSZ-13, called ZJM-1 (Xiao et al. Chem. Commun. 2011, 47, 9789; Chin. J. Catal. 2012, 33, 92).

They used a copper complex of Cu2+ with tetraethylenepentamine (TEPA) as the unique organic structure directing agent (OSDA) to synthesize the Cu-SSZ-13, being the main objective the introduction of cationic copper species in the SSZ-13 cages after the organic removal by calcination. SSZ-13 is the aluminosilicate form of CHA, and originally was synthesized by researchers at Chevron using as OSDA N,N,N-trimethyl-1-adamantammonium at pH values above of 12 (Zones, S. I., U.S. Pat. No. 4,544,538; 1985), which is accomplished by the introduction of a large amount of sodium hydroxide in the synthesis gel. Xiao et al. also required the presence of NaOH to increase the pH of the synthesis gel to get the Cu—SSZ-13 samples. From the examples described in the references (Xiao et al. Chem. Commun. 2011, 47, 9789; Chin. J. Catal. 2012, 33, 92), it can be extracted that theoretical ratios of NaOH/Si range between 0.2-0.6. Occasionally, high pH values in the synthesis of zeolites result in a dramatic decrease of the final solid yield due to some of silicate and/or aluminate species remain in solution, avoiding commercial application of those zeolites because economical issues. In the manuscripts published by Xiao, the final solid yields are not reported. However, the given Si/Al ratios in the gel (5, 7.5, 12.5, and 17.5) differ from the Si/Al ratios in the final solids (4.1, 4.3, 5.3, and 7.5, respectively). This clearly is an indication that the solid yield decreases when the Si/Al ratio increases. Importantly, the desired industrial catalysts for the SCR of NOx have to show high hydrothermal stability due to the severe work conditions (high temperature and steaming). It is well known that zeolites with Si/Al ratio lower than 10 suffer severe dealumination processes in presence of steam at high temperature. In fact, the SCR of NOx catalytic test described by Xiao was performed for the sample with Si/Al ratio of 4.1 and hydrothermal treatments were not performed over this sample. Furthermore, the different Cu-SSZ-13 examples reported by Xiao et al. show similar Cu loadings (Cu/Si=0.09-0.10) despite the original theoretical contents in the gels were different (Cu/Si=0.08, 0.12, 0.13 and 0.2). Those results clearly confirm that by using this methodology, the Cu-loading on SSZ-13 samples cannot be controlled.

It is the main object of this invention to provide a new process for the efficient manufacture of the silicoaluminophosphate SAPO-34 containing extra-framework copper atoms by a direct synthesis methodology with high solid yield, and controlled loading of copper atoms in the final solid. This procedure involves the combination of a copper-polyamine complex molecule and an additional organic molecute together with the silicon, aluminium and phosphorous sources required in a typical SAPO preparation. The additional organic molecule is required to direct the SAPO-34 crystallization, and at the same time, to control the loading of Cu in the final solid. Despite Cu-SAPO-34 is also obtained without the presence of the additional organic molecule (see "Table I"), the large amount of copper-complex (as for example copper complex of Cu2+ with tetra-ethylenepentamine, named up to now Cu-TEPA) required in the synthesis media [Cu-TEPA/(Al+P)=0.5] promotes a very large loading of copper in the final solid [Cu/(Al+P) between 0.14-0.21, see "Table III"]. Those samples show medium activity conversions in the SCR of NOx. If the copper-complex amount is reduced in the synthesis media [Cu-TEPA/(Al+P)<0.3, see "Table I"], amorphous materials were achieved. When different amounts of Cu-TEPA were introduced in the synthesis media [Cu-TEPA/(Al+P) between 0.1-0.4, see "Table IV"], and an excess of TEPA was added in the synthesis gel, amorphous or Cu-SAPO-34 with large amount of amorphous material were achieved.

The introduction of different Cu-TEPA contents together with an additional organic molecule capable to direct the SAPO-34 material, such as for example diethylamine, allowed the manufacture of different Cu-SAPO-34 materials with controlled Cu-loading in the final solids (see "Tables VI and VIII"), and very high yields of solids after calcination (>90% of the expected solid). Then, following this new methodology is possible to synthesize Cu-SAPO-34 with controlled Cu loadings in the final solids by a direct synthesis procedure, the range of Cu-loading in the final solids is much superior than other previously reported Cu-SAPO-34 materials synthesized by direct methodologies, those Cu atoms are primary in extra-framework cationic form (Cu-complex molecule remains unaltered inside of the as-prepared Cu-SAPO-34, as confirmed by UV-Vis spectroscopy, see "Figure 3"), and importantly, the final solid yield are much higher than other previous direct synthesis procedures.

The present invention also relates to the method of use of those Cu-SAPO-34 materials synthesized by using this cooperative structure directing agent procedure as catalysts for the selective catalytic reduction (SCR) of NOx. As seen in "Table X", those Cu-SAPO-34 materials performed extremely well under very realistic industrial conditions for the SCR of NOx (see catalytic description in Example 60). Therefore, the present invention relates to a process for the direct synthesis of Cu-SAPO-34 comprising at least the following steps:

Preparation of a mixture containing water, at least one silicon source, at least one Al source, at least one P source, at least one Cu source, at least one OSDA1 (where OSDA1 is any polyamine), and at least one OSDA2 (where OSDA2 is any organic molecule capable to direct the synthesis of the SAPO-34); and the final synthesis mixture has the next molar composition:

a Si:0.5 Al:b P:c Cu:d OSDA1:e OSDA2:f H2O
wherein a is in the range from 0.01 to 0.3;
wherein b is in the range from 0.2 to 0.49;
wherein c is in the range from 0.001 to 0.6;
wherein d is in the range from 0.001 to 0.6;
wherein e is in the range from 0.001 to 2;
wherein f is in the range from 1 to 200.

hydrothermal treatment of the mixture at 80-200° C. until formation of the crystalline material, and
recovery of the crystalline material.

According to (i), all possible silicon, aliminium, phosphorous and copper sources may be employed in the preparation of Cu-SAPO-34.

According to OSDA1, any polyamine molecule or mixtures of different polyamine molecules capable to form a complex structure with Cu atoms can be used, independently of the number of N atoms in their structure, independently of their shape or form (cyclic, linear, branched . . . ), and independently of the amine nature (primary, secondary or tertiary amines). Some examples of polyamines can be tetraethylenepentamine, triethylenetetramine, 1,4,8,11-tetraazacyclotetradecane or 1,4,8,11-tetramethyl-1,4,8,11-tetraazacyclotetradecane, among others.

According to OSDA2, any organic molecule capable to direct the SAPO-34 structure can be used. Some examples of organic molecules can be diethylamine, dipropylamine, triethanolamine, cyclohexylamine, morpholine, salts of tetraethylammonium, pidepiridine, among others.

According to (i), the final synthesis mixture can comprise the next molar compositions:

a Si:0.5 Al:b P:c Cu:d OSDA1:e OSDA2:f H2O wherein a is in the range from 0.01 to 0.3; more preferably in the range from 0.05 to 0.3; and more preferably in the range from 0.1 to 0.3, wherein b is in the range from 0.2 to 0.49; more preferably in the range from 0.2 to 0.45; and more preferably in the range from 0.2 to 0.4, wherein c is in the range from 0.001 to 0.6; more preferably in the range from 0.01 to 0.4; and more preferably in the range from 0.02 to 0.2, wherein d is in the range from 0.001 to 0.6; more preferably in the range from 0.01 to 0.4; and more preferably in the range from 0.02 to 0.2, wherein e is in the range from 0.001 to 2; more preferably in the range from 0.1 to 1; and more preferably from 0.2 to 0.7, and wherein f is in the range from 1 to 200; more preferably in the range from 2 to 100; and more preferably from 3 to 50. According to the crystallization process described in (ii), this hydrothermal treatment is performed in an autoclave, under static or dynamic conditions. The preferred temperature is ranged from 100 to 200° C., more preferably in the range of 130 to 175° C., and more preferably at 150° C. The preferred crystallization time is ranged from 6 hours to 50 days, more preferably in the range of 1 to 10 days, and more preferably in the range of 2 to 8 days. It should be taken into consideration that the components of the synthesis mixture may come from different sources, and depending on them times and crystallization conditions may vary.

In order to facilitate the synthesis, crystals of CHA can be added as seeds, in quantities up to 25% by weight respect to the total of oxides, to the synthesis mixture. These can be added before or during the crystallization of Cu-SAPO-34.

After crystallization stage, Cu-SAPO-34 crystals are separated from the mother liquor, and they are recovered. The solids can be washed and separated from the mother liquor by decantation, filtration, ultrafiltration, centrifugation, or any other solid-liquid separation technique.

The method of the present invention, when the aim is to produce the calcined crystalline material, comprises a stage of elimination of organic occluded inside the material, which can be performed by extraction and/or thermal treatment at temperatures over 25° C., during a period of time between 2 minutes and 25 hours.

The material produced by this invention may be pelletized in accordance with known techniques. They can also be used in different processes.

The present invention further relates to a method of converting feeds formed from organic compounds, characterized in that it comprises bringing said feed into contact with an active form of the porous crystalline material of the invention.

Moreover, the present invention can be used as catalyst for the selective reduction ("SCR") of nitrogen oxides (NOx) in a gas stream. In particular, the SCR of NOx wherein the molecular sieve according to the present invention is used as catalyst in presence of a reductant, as ammonia, urea and/or hydrocarbon.

EXAMPLES

Examples 1 to 30

Direct synthesis of Cu-SAPO-34 using Different Amounts of Cu-complex (Cu-tetraethylenepentamine, Cu-TEPA) without the Presence of a Cooperative OSDA A typical preparation of present examples was as follows: as a first step, the Cu-complex molecule was prepared. To do that, a 20% wt of an aqueous solution of copper (II) sulfate (98% wt, Alfa) was mixed with the required amount of tetraethylenepentamine (TEPA, 99% wt, Aldrich), and kept under stirring during 2 hours. As a second step, the required amount of distilled water and phosphoric acid (85% wt, Aldrich) were added, and stirred during 5 minutes. Afterwards, alumina (75% wt, Condea) and silica (Ludox AS40 40% wt, Aldrich) sources were introduced in the gel mixture, and maintained under stirring during 30 minutes, or the required time if evaporation of solvent was needed to achieve the desired gel concentration. Once the synthesis gels were prepared, they were transferred to an autoclave with Teflon liners, and heated to a temperature of 150° C. during 7 days under static conditions. The samples after hydrothermal crystallization were filtered and washed with abundant distilled water, and finally dried at 100° C.

The samples were characterized by Powder X-ray Diffraction (PXRD) in order to know the achieved phase after the crystallization process.

If required, the samples were calcined at 550° C. in air in order to remove the organic moieties precluded inside of the microporous material during the crystallization process.

The different synthesis molar ratios selected for the Examples 1-30 are summarized in "Table I". The achieved phases are also depicted in "Table I". Additionally, the required amount of each precursor used during the synthesis of each example can be seen in "Table II".

TABLE I

Synthesis molar ratios and achieved phases in the study of the direct synthesis of Cu-SAPO-34 using different amounts of Cu-complex (Cu-TEPA) without the presence of a cooperative OSDA
Synthesis conditions: T = 150° C., 7 days

| Example | P/Al | Si/(P + Al) | TEPA/(P + Al) | Cu/(P + Al) | H2O/(P + Al) | co-OSDA/(P + Al) | Sample |
| --- | --- | --- | --- | --- | --- | --- | --- |
| 1 | 0.9 | 0.1 | 0.05 | 0.05 | 10 | 0 | Amorp. |
| 2 | 0.9 | 0.1 | 0.1 | 0.1 | 10 | 0 | Amorp. |
| 3 | 0.9 | 0.1 | 0.2 | 0.2 | 10 | 0 | Amorp. |
| 4 | 0.9 | 0.1 | 0.3 | 0.3 | 10 | 0 | Amorp. |
| 5 | 0.9 | 0.1 | 0.5 | 0.5 | 10 | 0 | SAPO-34 |
| 6 | 0.9 | 0.1 | 0.05 | 0.05 | 30 | 0 | Amorp. |
| 7 | 0.9 | 0.1 | 0.1 | 0.1 | 30 | 0 | Amorp. |
| 8 | 0.9 | 0.1 | 0.2 | 0.2 | 30 | 0 | Amorp. |
| 9 | 0.9 | 0.1 | 0.3 | 0.3 | 30 | 0 | Amorp. |
| 10 | 0.9 | 0.1 | 0.5 | 0.5 | 30 | 0 | SAPO-34 |
| 11 | 0.9 | 0.1 | 0.05 | 0.05 | 50 | 0 | Amorp. |

TABLE I-continued

Synthesis molar ratios and achieved phases in the
study of the direct synthesis of Cu-SAPO-34 using different
amounts of Cu-complex (Cu-TEPA) without the presence of a
cooperative OSDA
Synthesis conditions: T = 150° C., 7 days

| Example | P/Al | Si/P + Al) | TEPA/ P + Al) | Cu/ P + Al) | H2O/ P + Al) | co-OSDA/ (P + Al) | Sample |
|---|---|---|---|---|---|---|---|
| 12 | 0.9 | 0.1 | 0.1 | 0.1 | 50 | 0 | Amorp. |
| 13 | 0.9 | 0.1 | 0.2 | 0.2 | 50 | 0 | Amorp. |
| 14 | 0.9 | 0.1 | 0.3 | 0.3 | 50 | 0 | Amorp. |
| 15 | 0.9 | 0.1 | 0.5 | 0.5 | 50 | 0 | SAPO-34 |
| 16 | 0.8 | 0.2 | 0.05 | 0.05 | 10 | 0 | Amorp. |
| 17 | 0.8 | 0.2 | 0.1 | 0.1 | 10 | 0 | Amorp. |
| 18 | 0.8 | 0.2 | 0.2 | 0.2 | 10 | 0 | Amorp. |
| 19 | 0.8 | 0.2 | 0.3 | 0.3 | 10 | 0 | Amorp. |
| 20 | 0.8 | 0.2 | 0.5 | 0.5 | 10 | 0 | SAPO-34 |
| 21 | 0.8 | 0.2 | 0.05 | 0.05 | 30 | 0 | Amorp. |
| 22 | 0.8 | 0.2 | 0.1 | 0.1 | 30 | 0 | Amorp. |
| 23 | 0.8 | 0.2 | 0.2 | 0.2 | 30 | 0 | Amorp. |
| 24 | 0.8 | 0.2 | 0.3 | 0.3 | 30 | 0 | Amorp. |
| 25 | 0.8 | 0.2 | 0.5 | 0.5 | 30 | 0 | SAPO-34 |
| 26 | 0.8 | 0.2 | 0.05 | 0.05 | 50 | 0 | Amorp. |
| 27 | 0.8 | 0.2 | 0.1 | 0.1 | 50 | 0 | Amorp. |
| 28 | 0.8 | 0.2 | 0.2 | 0.2 | 50 | 0 | Amorp. |
| 29 | 0.8 | 0.2 | 0.3 | 0.3 | 50 | 0 | Amorp. |
| 30 | 0.8 | 0.2 | 0.5 | 0.5 | 50 | 0 | SAPO-34 |

TABLE II

Required quantity of each precursor in the study
of the direct synthesis of Cu-SAPO-34 using different
amounts of Cu-complex (Cu-TEPA) without the presence of a
cooperative OSDA
Synthesis conditions: T = 150° C., 7 Days

| Example | SiO2 (40% wt) | Al2O3 (75% wt) | H3PO4 (85% wt) | TEPA | Cu (20% wt) | H2O | Gel |
|---|---|---|---|---|---|---|---|
| 1 | 60 | 143 | 218 | 38 | 160 | 488 | 1107 |
| 2 | 60 | 143 | 218 | 76 | 319 | 360 | 1177 |
| 3 | 60 | 143 | 218 | 151 | 638 | 105 | 1316 |
| 4 | 53 | 125 | 191 | 199 | 838 | 0 | 1274 |
| 5 | 60 | 143 | 218 | 379 | 1596 | 0 | 1735 |
| 6 | 53 | 125 | 191 | 33 | 140 | 1687 | 2228 |
| 7 | 38 | 89 | 137 | 47 | 200 | 1125 | 1635 |
| 8 | 53 | 125 | 191 | 133 | 559 | 1352 | 2412 |
| 9 | 33 | 79 | 120 | 125 | 527 | 709 | 1593 |
| 10 | 53 | 125 | 191 | 331 | 1397 | 681 | 2778 |
| 11 | 38 | 89 | 137 | 24 | 100 | 2105 | 2492 |
| 12 | 38 | 89 | 137 | 47 | 200 | 2025 | 2535 |
| 13 | 38 | 89 | 137 | 95 | 399 | 1865 | 2623 |
| 14 | 35 | 82 | 126 | 131 | 551 | 1569 | 2493 |
| 15 | 33 | 79 | 120 | 208 | 878 | 1220 | 2538 |
| 16 | 120 | 151 | 205 | 38 | 160 | 452 | 1125 |
| 17 | 120 | 151 | 205 | 76 | 319 | 324 | 1195 |
| 18 | 120 | 151 | 205 | 151 | 638 | 69 | 1335 |
| 19 | 120 | 151 | 205 | 227 | 958 | 0 | 1474 |
| 20 | 120 | 151 | 205 | 379 | 1596 | 0 | 1753 |
| 21 | 105 | 132 | 179 | 33 | 140 | 1655 | 2245 |
| 22 | 75 | 94 | 128 | 47 | 200 | 1103 | 1647 |
| 23 | 105 | 132 | 179 | 133 | 559 | 1320 | 2428 |
| 24 | 69 | 87 | 118 | 131 | 551 | 721 | 1676 |
| 25 | 105 | 132 | 179 | 331 | 1397 | 650 | 2794 |
| 26 | 75 | 94 | 128 | 24 | 100 | 2082 | 2503 |
| 27 | 75 | 94 | 128 | 47 | 200 | 2003 | 2547 |
| 28 | 75 | 94 | 128 | 95 | 399 | 1843 | 2634 |
| 29 | 69 | 87 | 118 | 131 | 551 | 1549 | 2504 |
| 30 | 69 | 87 | 118 | 218 | 918 | 1255 | 2664 |

Interestingly, from the previous set of experiments, it can be concluded that only when large amount of Cu-complex is introduced in the synthesis gel [Cu-TEPA/(Al+P)=0.5], Cu-SAPO-34 material is achieved (see "Table I"). If the copper-complex amount is reduced in the synthesis media [Cu-TEPA/(Al+P)<0.3, see "Table I"], amorphous materials were achieved, being impossible to control different Cu-loadings by a direct synthesis methodology in the Cu-SAPO-34 materials. Moreover, the large amount of copper-complex required in the synthesis media [Cu-TEPA/(Al+P)=0.5] promotes a very large loading of copper in the final solid [Cu/(Al+P) between 0.13-0.21, see "Table III"]. Those samples show medium activity conversions in the SCR of NOx (see "Table X").

TABLE III

Elemental and chemical analyses of the Cu-SAPO-34 materials achieved in the study of the direct synthesis of Cu-SAPO-34 using different amounts of Cu-complex (Cu-TEPA) without the presence of a cooperative OSDA
Synthesis conditions: T = 150° C., 7 Days

| Example | Si/(Al + P) | Cu/(Al + P) | C/N) real | C/N) teor |
|---|---|---|---|---|
| 5 | 0.27 | 0.21 | 1.5 | 1.6 |
| 10 | 0.18 | 0.14 | 1.6 | 1.6 |
| 15 | 0.17 | 0.14 | 1.6 | 1.6 |
| 20 | 0.23 | 0.21 | 1.6 | 1.6 |
| 25 | 0.22 | 0.13 | 1.6 | 1.6 |
| 30 | 0.23 | 0.13 | 1.6 | 1.6 |

Examples 31 to 40

Direct synthesis of Cu-SAPO-34 using different amounts of Cu-complex (Cu-TEPA) with the addition of an excess of TEPA The present examples attempted to control the Cu-loading into the Cu-SAPO-34. Then, controlled amounts of Cu-complex [Cu-TEPA/(Al+P)=0.1, 0.2, 0.3 and 0.4] were introduced in the synthesis gel, and additional TEPA was added in the mixture until the total ratio of TEPA/(Al+P) of 0.5.

A typical preparation of present examples was as follows: as a first step, the Cu-complex molecule was prepared. To do that, a 20% wt of an aqueous solution of copper (II) sulfate (98% wt, Alfa) was mixed with the required amount of tetraethylenepentamine (TEPA, 99% wt, Aldrich), and kept under stirring during 2 hours. As a second step, the required amount of distilled water and phosphoric acid (85% wt, Aldrich) were added, and stirred during 5 minutes. Afterwards, alumina (75% wt, Condea) and silica (Ludox AS40 40% wt, Aldrich) sources were introduced in the gel mixture, and maintained under stirring during 30 minutes, or the required time if evaporation of solvent was needed to achieve the desired gel concentration. Once the synthesis gels were prepared, they were transferred to an autoclave with Teflon liners, and heated to a temperature of 150° C. during 7 days under static conditions. The samples after hydrothermal crystallization were filtered and washed with abundant distilled water, and finally dried at 100° C.

The samples were characterized by Powder X-ray Diffraction (PXRD) in order to know the achieved phase after the crystallization process.

The different synthesis molar ratios selected for the Examples 31-40 are summarized in "Table IV". The achieved phases are also depicted in "Table IV". Additionally, the required amount of each precursor used during the synthesis of each example can be seen in "Table V".

Unfortunately, as see in "Table IV", pure Cu-SAPO-34 was not achieved in those experiments.

TABLE IV

Synthesis molar ratios and achieved phases in the study of the direct synthesis of Cu-SAPO-34 using different amounts of Cu-complex (Cu-TEPA) with the addition of an excess of TEPA
Synthesis conditions: T = 150° C., 7 Days

| Example | P/Al | Si/ P + Al) | TEPA/ P + Al) | Cu/ P + Al) | H2O/ P + Al) | Co-OSDA/ P + Al) | Sample |
|---|---|---|---|---|---|---|---|
| 31 | 0.9 | 0.1 | 0 | 0 | 30 | 0 | ALPO H3 |
| 32 | 0.9 | 0.1 | 0.5 | 0 | 30 | 0 | Amorp. |
| 33 | 0.9 | 0.1 | 0.5 | 0.1 | 30 | 0 | Amorp. + SAPO-34 |
| 34 | 0.9 | 0.1 | 0.5 | 0.2 | 30 | 0 | Amorp. + SAPO-34 |
| 35 | 0.9 | 0.1 | 0.5 | 0.3 | 30 | 0 | Amorp. + SAPO-34 |
| 36 | 0.9 | 0.1 | 0.5 | 0.4 | 30 | 0 | Amorp. + SAPO-34 |
| 37 | 0.8 | 0.2 | 0.5 | 0.1 | 30 | 0 | Amorp. + SAPO-34 |
| 38 | 0.8 | 0.2 | 0.5 | 0.2 | 30 | 0 | Amorp. + SAPO-34 |
| 39 | 0.8 | 0.2 | 0.5 | 0.3 | 30 | 0 | Amorp. + SAPO-34 |
| 40 | 0.8 | 0.2 | 0.5 | 0.4 | 30 | 0 | Amorp. + SAPO-34 |

TABLE V

Required quantity of each precursor in the study of the direct synthesis of Cu-SAPO-34 using different amounts of Cu-complex (Cu-TEPA) with the addition of an excess of TEPA
Synthesis conditions: T = 150° C., 7 Days

| Example | SiO2 (40% wt) | Al2O3 (75% wt) | H3PO4 (85% wt) | TEPA | Cu (20% wt) | H2O | Gel |
|---|---|---|---|---|---|---|---|
| 31 | 45 | 107 | 164 | 0 | 0 | 1542 | 1858 |
| 32 | 45 | 107 | 164 | 284 | 0 | 1542 | 2142 |

TABLE V-continued

Required quantity of each precursor in the study of the direct synthesis of Cu-SAPO-34 using different amounts of Cu-complex (Cu-TEPA) with the addition of an excess of TEPA
Synthesis conditions: T = 150° C., 7 Days

| Example | SiO2 (40% wt) | Al2O3 (75% wt) | H3PO4 (85% wt) | TEPA | Cu (20% wt) | H2O | Gel |
|---|---|---|---|---|---|---|---|
| 33 | 45 | 107 | 164 | 284 | 239 | 1350 | 2190 |
| 34 | 45 | 107 | 164 | 284 | 479 | 1158 | 2237 |
| 35 | 45 | 107 | 164 | 284 | 718 | 967 | 2285 |
| 36 | 45 | 107 | 164 | 284 | 958 | 775 | 2333 |
| 37 | 90 | 113 | 154 | 284 | 239 | 1323 | 2204 |
| 38 | 90 | 113 | 154 | 284 | 479 | 1131 | 2251 |
| 39 | 90 | 113 | 154 | 284 | 718 | 940 | 2299 |
| 40 | 81 | 102 | 138 | 256 | 862 | 674 | 2112 |

Examples 41 to 56

Direct synthesis of Cu-SAPO-34 using Different Amounts of Cu-complex (Cu-TEPA) in Combination with a Cooperative OSDA (diethylamine, DEA)

The present examples attempted to control the Cu-loading into the Cu-SAPO-34. Then, controlled amounts of Cu-complex [Cu-TEPA/(Al+P)=0.05, 0.1, 0.15 and 0.2] were introduced in the synthesis gel, and a cooperative OSDA, such as diethylamine (DEA), was added in the mixture.

A typical preparation of present examples was as follows: as a first step, the Cu-complex molecule was prepared. To do that, a 20% wt of an aqueous solution of copper (II) sulfate (98% wt, Alfa) was mixed with the required amount of tetraethylenepentamine (TEPA, 99% wt, Aldrich), and kept under stirring during 2 hours. As a second step, the required amount of distilled water and phosphoric acid (85% wt, Aldrich) were added, and stirred during 5 minutes. Afterwards, alumina (75% wt, Condea) and silica (Ludox AS40 40% wt, Aldrich) sources were introduced in the gel mixture. Finally, the required quantity of diethylamine (99% wt, Aldrich) was added in the gel, and seeds of SAPO-34 if required ( % wt respect to the total of oxides), and maintained under stirring during 30 minutes. Once the synthesis gels were prepared, they were transferred to an autoclave with Teflon liners, and heated to a temperature of 150° C. during 5 days under static conditions. The samples after hydrothermal crystallization were filtered and washed with abundant distilled water, and finally dried at 100° C.

The samples were characterized by Powder X-ray Diffraction (PXRD) in order to know the achieved phase after the crystallization process. If required, the samples were calcined at 550° C. in air in order to remove the organic moieties precluded inside of the microporous material during the crystallization process.

The different synthesis molar ratios selected for the Examples 41-56 are summarized in "Table VI". The achieved phases are also depicted in "Table VI". Additionally, the required amount of each precursor used during the synthesis of each example can be seen in "Table VII".

TABLE VI

Synthesis molar ratios and achieved phases in the study of the direct synthesis of Cu-SAPO-34 using different amounts of Cu-complex (Cu-TEPA) in combination with a cooperative OSDA (diethylamine, DEA)
Synthesis conditions: T = 150° C., 5 Days

| Example | P/Al | Si/(P + Al) | TEPA/(P + Al) | Cu/(P + Al) | H2O/(P + Al) | Co-OSDA/(P + Al) | Seeds (% wt) | Sample |
|---|---|---|---|---|---|---|---|---|
| 41 | 0.9 | 0.1 | 0.05 | 0.05 | 10 | 0.45 | — | SAPO-34 + Amorp. |
| 42 | 0.9 | 0.1 | 0.1 | 0.1 | 10 | 0.4 | — | SAPO-34 + Amorp. |
| 43 | 0.9 | 0.1 | 0.15 | 0.15 | 10 | 0.35 | — | SAPO-34 + Amorp. |
| 44 | 0.9 | 0.1 | 0.2 | 0.2 | 10 | 0.3 | — | SAPO-34 + Amorp. |
| 45 | 0.8 | 0.2 | 0.05 | 0.05 | 10 | 0.45 | — | SAPO-34 + Amorp. |
| 46 | 0.8 | 0.2 | 0.1 | 0.1 | 10 | 0.4 | — | SAPO-34 |
| 47 | 0.8 | 0.2 | 0.15 | 0.15 | 10 | 0.35 | — | SAPO-34 |
| 48 | 0.8 | 0.2 | 0.2 | 0.2 | 10 | 0.3 | — | SAPO-34 |
| 49 | 0.8 | 0.2 | 0.05 | 0.05 | 10 | 0.45 | 2 | SAPO- |

TABLE VI-continued

Synthesis molar ratios and achieved phases in the study of the direct synthesis of Cu-SAPO-34 using different amounts of Cu-complex (Cu-TEPA) in combination with a cooperative OSDA (diethylamine, DEA)
Synthesis conditions: T = 150° C., 5 Days

| Example | P/Al | Si/(P + Al) | TEPA/(P + Al) | Cu/(P + Al) | H2O/(P + Al) | Co-OSDA/(P + Al) | Seeds (% wt) | Sample |
|---|---|---|---|---|---|---|---|---|
| 50 | 0.8 | 0.2 | 0.1 | 0.1 | 10 | 0.4 | 2 | SAPO-34 |
| 51 | 0.8 | 0.2 | 0.15 | 0.15 | 10 | 0.35 | 2 | SAPO-34 |
| 52 | 0.8 | 0.2 | 0.2 | 0.2 | 10 | 0.3 | 2 | SAPO-34 |
| 53 | 0.8 | 0.2 | 0.05 | 0.05 | 10 | 0.45 | 5 | SAPO-34 |
| 54 | 0.8 | 0.2 | 0.1 | 0.1 | 10 | 0.4 | 5 | SAPO-34 |
| 55 | 0.8 | 0.2 | 0.15 | 0.15 | 10 | 0.35 | 5 | SAPO-34 |
| 56 | 0.8 | 0.2 | 0.2 | 0.2 | 10 | 0.3 | 5 | SAPO-34 |

TABLE VII

Required quantity of each precursor in the study of the direct synthesis of Cu-SAPO-34 using different amounts of Cu-complex (Cu-TEPA) in combination with a cooperative OSDA (diethylamine, DEA)
Synthesis conditions: T = 150° C., 5 Days

| Example | SiO2 (40% wt) | Al2O3 (75% wt) | H3PO4 (85% wt) | TEPA | Cu (20% wt) | H2O | DEA | Gel |
|---|---|---|---|---|---|---|---|---|
| 41 | 60 | 143 | 218 | 38 | 160 | 488 | 132 | 1238 |
| 42 | 60 | 143 | 218 | 76 | 319 | 360 | 117 | 1294 |
| 43 | 53 | 125 | 191 | 99 | 419 | 203 | 90 | 1180 |
| 44 | 53 | 125 | 191 | 133 | 559 | 92 | 77 | 1228 |
| 45 | 75 | 94 | 128 | 24 | 100 | 282 | 82 | 786 |
| 46 | 66 | 83 | 113 | 42 | 176 | 178 | 64 | 722 |
| 47 | 120 | 151 | 205 | 114 | 479 | 196 | 102 | 1367 |
| 48 | 120 | 151 | 205 | 151 | 638 | 69 | 88 | 1422 |
| 49 | 105 | 132 | 179 | 33 | 140 | 395 | 115 | 1100 |
| 50 | 105 | 132 | 179 | 66 | 279 | 284 | 102 | 1148 |
| 51 | 120 | 151 | 205 | 114 | 479 | 196 | 102 | 1367 |
| 52 | 120 | 151 | 205 | 151 | 638 | 69 | 88 | 1422 |
| 53 | 105 | 132 | 179 | 33 | 140 | 395 | 115 | 1100 |
| 54 | 105 | 132 | 179 | 66 | 279 | 284 | 102 | 1148 |
| 55 | 120 | 151 | 205 | 114 | 479 | 196 | 102 | 1367 |
| 56 | 120 | 151 | 205 | 151 | 638 | 69 | 88 | 1422 |

From the previous set of experiments, Cu-SAPO-34 materials are achieved with different Cu contents in the synthesis gel. Interestingly, different Cu loadings are accomplished also in the final solids (see "Table VIII").

TABLE VIII

Elemental and chemical analyses of the Cu-SAPO-34 materials achieved in the study of the direct synthesis of Cu-SAPO-34 (Cu-TEPA) using different amounts of Cu-complex in combination with a cooperative OSDA (diethylamine, DEA)
Synthesis conditions: T = 150° C., 5 Days

| Example | Si/(P + Al) | Cu/(P + Al) | C/N real | % DEA | % TEPA |
|---|---|---|---|---|---|
| 52 | 0.22 | 0.12 | 1.73 | 4.2 | 95.8 |
| 53 | 0.23 | 0.04 | 2.05 | 20.8 | 79.2 |
| 54 | 0.24 | 0.07 | 1.77 | 8.3 | 91.7 |

More importantly, the final solid yield of the Cu-SAPO-34 obtained in "Example 54" after its calcination is higher than 90%. This value is much higher than reported yields in the direct synthesis of Cu-SAPO-34 provided by researchers at BASF in their patent (Bull, I. et al. EP 2,269,733 A1, 2011).

Example 57

Other characterization of Cu-SAPO-34 synthesized in the Example 54

The sample synthesized in Example 54 has been further characterized by PXRD, scanning electron microscopy (SEM), and UV-Vis spectroscopy. "Figure 1" shows the PXRD of the Cu-SAPO-34 material of Example 54 in its as-prepared and calcined form, confirming the structure and high-crystallinity of SAPO-34 before and after calcination.

BRIEF DESCRIPTION OF THE DRAWINGS

FIG. 2: SEM image of Cu-SAPO-34 of Example 54.

FIG. 3: UV-Vis spectra of Cu-TEPA complex in solution (a), and as-prepared Cu-SAPO-34 of Example 54.

Example 58

Direct synthesis of Cu-SAPO-34 using a cyclic polyamine for the formation of Cu-complex (Cu-1,4,8,11-tetraazacyclotetradecane, Cu-cyclam) in combination with a cooperative OSDA (diethylamine, DEA)

The present examples attempted to control the Cu-loading into the Cu-SAPO-34, but using a different polyamine in the formation of Cu-complex. In the present example, the cyclic polyamine 1,4,8,11-tetraazacyclotetradecane, also called cyclam, is introduced in the synthesis gel, together with a cooperative OSDA, such as diethylamine (DEA).

A typical preparation of present example was as follows: as a first step, the Cu-complex molecule was prepared. To do that, 100 mg of 20% wt of an aqueous solution of copper (II) sulfate (98% wt, Alfa) was mixed with 25 mg of 1,4,8,11-tetraazacyclotetradecane (cyclam, 98% wt, Aldrich), and kept under stirring during 2 hours. As a second step, 282 mg of distilled water and 128 mg of phosphoric acid (85% wt, Aldrich) were added, and stirred during 5 minutes. Afterwards, 94 mg of alumina (75% wt, Condea) and 75 mg of silica (Ludox AS40 40% wt, Aldrich) sources were introduced in the gel mixture. Finally, 82 mg of diethylamine (99% wt, Aldrich) was added in the gel and maintained under stirring during 30 minutes. The molar gel compositions were the next: P/Al=0.8; Si/(P+Al)=0.2; Cu-cyclam/(Al+P)=0.05; DEA/(Si+Al)=0.45; H2O/(Si+Al)=10. Once the synthesis gel was prepared, it was transferred to an autoclave with a Teflon liner, and heated to a temperature of 150° C. during 5 days under static conditions. The sample after hydrothermal crystallization was filtered and washed with abundant distilled water, and finally dried at 100° C.

The sample was calcined at 550° C. in air in order to remove the organic moieties precluded inside of the microporous material during the crystallization process.

Example 59

Characterization of Cu-SAPO-34 synthesized in the Example 58

The sample synthesized in Example 58 has been characterized by PXRD, scanning electron microscopy (SEM), and UV-Vis spectroscopy. "Figure 4" shows the PXRD of the Cu-SAPO-34 material of Example 58 in its as-prepared and calcined form, confirming the structure and high-crystallinity of SAPO-34 before and after calcination.

Figure 1:
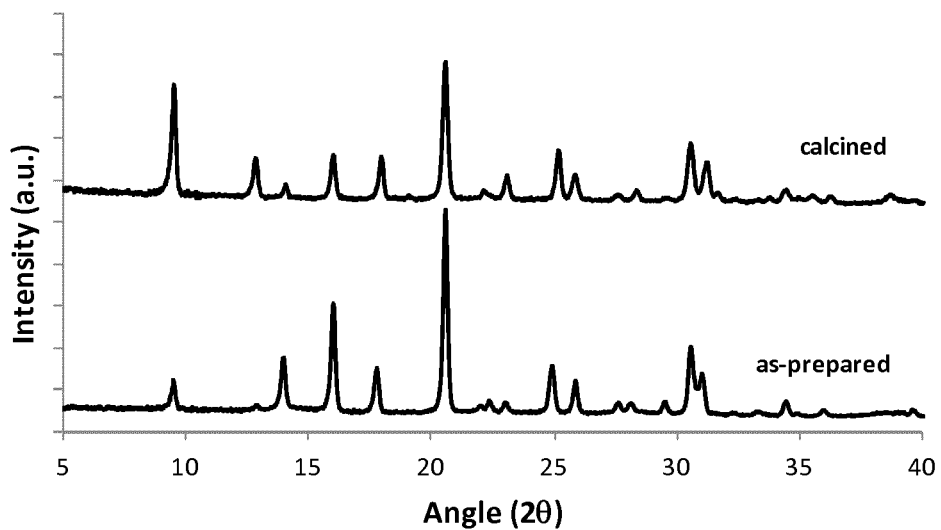
FIG. 1: PXRD patterns of the as-prepared and calcined form of Cu-SAPO-34 of Example 54.
Figure 2:
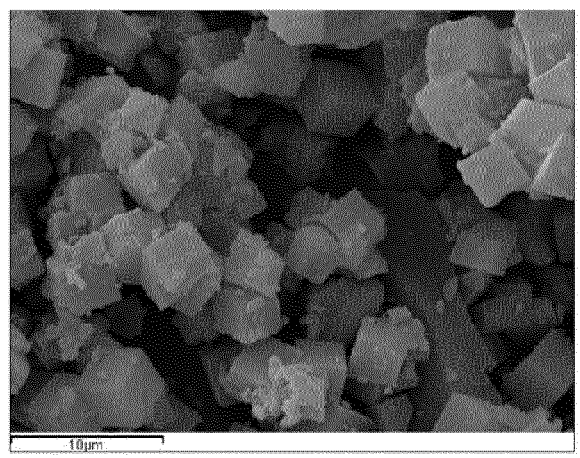
"FIG. 2" shows the SEM image of the Cu-SAPO-34 material of Example 54, revealing a crystal size of 6-8 μm.
Figure 3:
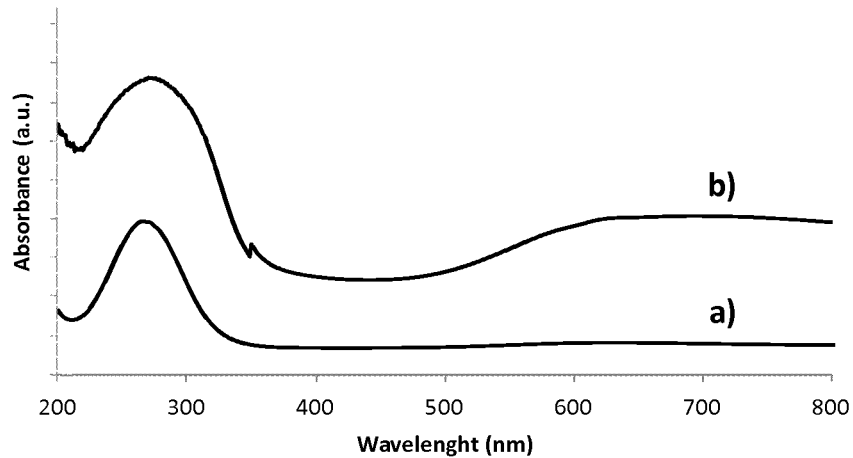
"FIG. 3" shows the UV-Vis spectra of the Cu-TEPA complex in solution (a) and the as-prepared Cu-SAPO-34 of Example 54 (b). Both spectra exhibit a strong band at 270 nm, revealing that Cu-TEPA complex is retained after crystallization, leading the presence of Cu2+extra-framework cations after organic removal.
Figure 4:
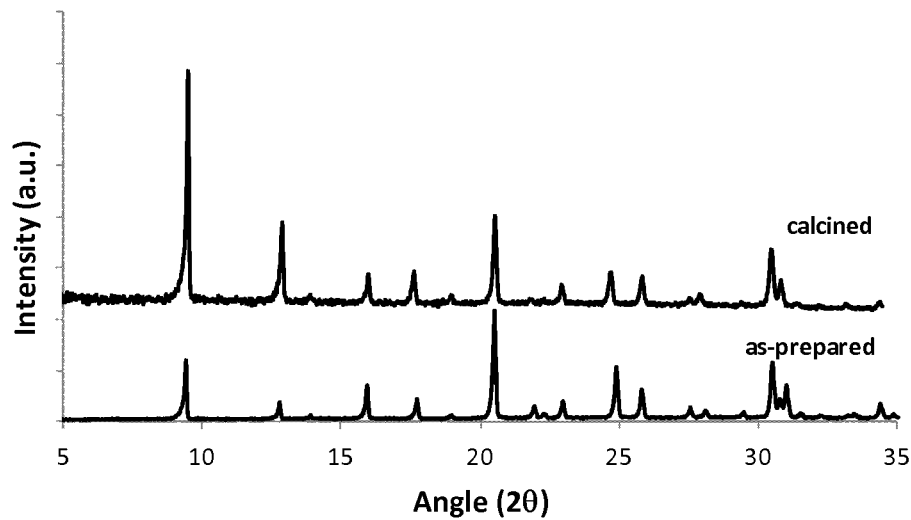

FIG. 4: PXRD patterns of the as-prepared and calcined form of Cu-SAPO-34 of Example 58.

Figure 5:
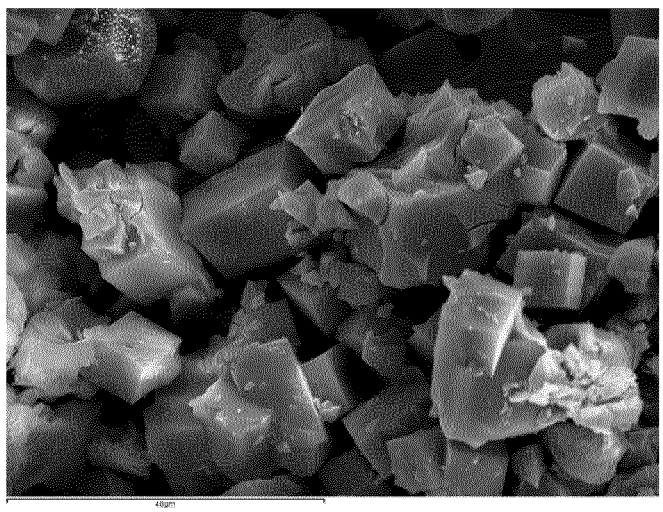

"FIG. 5" shows the SEM image of the Cu-SAPO-34 material of Example 58, revealing a crystal size of 10-15 μm.

FIG. 5: SEM image of Cu-SAPO-34 of Example 58.

Figure 6:
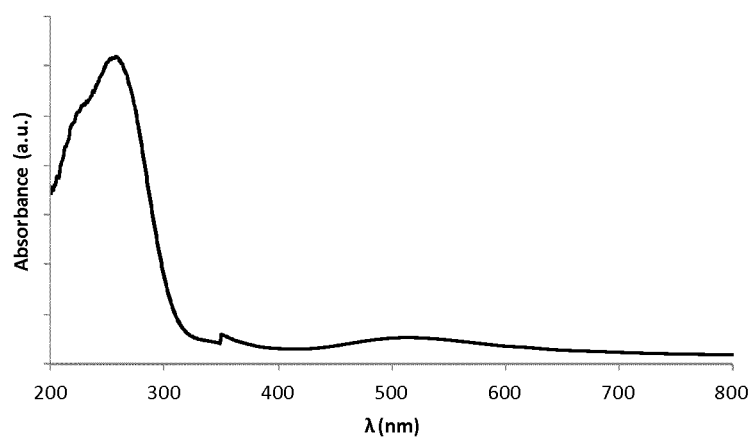

"FIG. 6" shows the UV-Vis spectrum of the as-prepared Cu-SAPO-34 of Example 58. This spectrum exhibits a strong band at 270 nm, revealing that Cu-cyclam complex is retained after crystallization, leading the presence of Cu2+ extra-framework cations after organic removal.

FIG. 6: UV-Vis spectrum of as-prepared Cu-SAPO-34 of Example 58

Example 60

Preparation of Cu-exchanged SAPO-34

The procedure used for the synthesis of SAPO-34 was: 2.05 g of phosphoric acid (85% wt, Aldrich) was diluted in 8.7 g of distilled water, stirring the resultant solution during 5 minutes. Afterwards, 1.5 g of alumina (75% wt, Condea) and 1.04 g of silica (Ludox AS40 40% wt, Aldrich) were introduced in the gel mixture. Finally, 1.65 g of diethylamine (99% wt, Aldrich) was added in the gel, maintaining under agitation during 30 minutes. Once the synthesis gel was prepared, it was transferred to an autoclave with a Teflon liner, and heated to a temperature of 200° C. during 72 hours under static conditions. The sample after hydrothermal crystallization was filtered and washed with abundant distilled water, and finally dried at 100° C. The sample was characterized by PXRD, showing the characteristic PXRD pattern of SAPO-34. The sample was calcined at 550° C. in air in order to remove the organic moieties precluded inside of the microporous material during the crystallization process.

In order to perform the Cu ion exchange on this SAPO-34 material, the calcined sample was first washed with NaNO3 (0.04M), and afterwards, the sample was exchanged at room temperature with a Cu(CH3CO2)2 solution (solid/liquid ratio of 10 g/L). Finally, the sample was filtered and washed with distilled water, and calcined at 550° C. for 4 h.

Example 61

Catalytic tests on SCR of NOx Over Different Cu-SAPO-34 Synthesized by the Present Invention The activity of the samples for the catalytic reduction of NOx was studied in a fixed bed, quartz tubular reactor of 2.2 cm of diameter and 53 cm of length. In a typical experiment, the catalyst was prepared with a particle size of 0.25-0.42 mm. It was introduced in the reactor, heated up to 550° C. (see reaction conditions in "Table IX") and maintained at these temperatures for one hour under nitrogen flow. After that the desired reaction temperature was set and the reaction feed admitted. The SCR of NOx was studied using NH3 as reductor. The NOx present in the outlet gases from the reactor were analyzed continuously by means of a chemi-luminiscence detector (Thermo 62C).

TABLE IX

| Reaction conditions for SCR of NOx. | |
|---|---|
| Total gas flow (mL/min) | 300 |
| Catalyst load (mg) | 40 |
| NO concentration (ppm) | 500 |
| NH3 concentration (ppm) | 530 |
| O2 concentration (%) | 7 |
| H2O concentration (%) | 5 |
| Testing temperature interval (° C.) | 170-550 |

The catalytic results are summarized in "Table X"

TABLE X

NOx conversion (%) at various temperatures (200, 250, 300, 350, 400, 450, 500° C.) using different Cu-SAPO-34 materials synthesized following the methodology presented in this invention.

NOx conversion (%) at different temperatures

| | 200° C. | 250° C. | 300° C. | 350° C. | 400° C. | 450° C. | 500° C. |
|---|---|---|---|---|---|---|---|
| Example 5 | 32 | 41 | 47 | 50 | 52 | 55 | 40 |
| Example 25 | 31 | 58 | 75 | 82 | 82 | 75 | 70 |
| Example 30 | 22 | 48 | 53 | 70 | 71 | 67 | 61 |
| Example 52 | 65 | 91 | 95 | 97 | 90 | 80 | 68 |
| Example 53 | 65 | 89 | 92 | 95 | 94 | 89 | 77 |
| Example 54 | 88 | 100 | 100 | 100 | 100 | 98 | 87 |
| Example 60 | 28 | 52 | 58 | 65 | 72 | 68 | 30 |

The invention claimed is:

1. Process for the direct synthesis of Cu-SAPO-34 comprising the steps of:
   (i) preparing a synthesis mixture containing water, at least one silicon source, at least one Al source, at least one P source, at least one Cu source, at least one OSDA1 wherein the OSDA1 is a polyamine selected from the group of tetraethylenepentamine, triethylenetetramine, 1,4,8,11-tetraazacyclotetradecane or 1,4,8,11-tetramethyl-1,4,8,11-tetraazacyclotetradecane, and at least one OSDA2, wherein the OSDA2 is an organic compound different from polyamine and capable of directing the synthesis of the SAPO-34 and a final synthesis mixture having a molar composition of:
   a Si:0.5 Al:b P:c Cu:d OSDA1:e OSDA2:fH2O
   where a is in the range from 0.01 to 0.3;
   where b is in the range from 0.2 to 0.49;
   where c is in the range from 0.001 to 0.6;
   where d is in the range from 0.001 to 0.6;
   where e is in the range from 0.001 to 2;
   where f is in the range from 1 to 200;
   (ii) hydrothermally treating the mixture at 80-200° C. until formation of crystalline material,
   (iii) recovering of the crystalline material,
   (iv) removing OSDA1 and OSDA2 from the crystalline material.

2. The process according to claim 1, wherein the OSDA1 comprises at least one of tetraethylenepentamine, triethylenetetramine, 1,4,8,11-tetraazacyclotetradecane, 1,4,8,11-tetramethyl-1,4,8,11-tetraazacyclotetradecane.

3. The process of claim 1, wherein the OSDA2 comprises at least one of diethylamine, dipropylamine, triethanolamine, cyclohexylamine, morpholine, salts of tetraethylammonium, pidepiridine.

4. The process of claim 1, wherein the final synthesis mixture comprises the following molar compositions:
   a Si:0.5 Al:b P:c Cu:d OSDA1:e OSDA2:fH2O
   wherein a is in the range from 0.05 to 0.3;
   wherein b is in the range from 0.2 to 0.45;
   wherein c is in the range from 0.01 to 0.4;
   wherein d is in the range from 0.01 to 0.4;
   wherein e is in the range from 0.1 to 1; and
   wherein f is in the range from 2 to 100.

5. The process of claim 1, wherein the crystallization step (ii) is performed in an autoclave, under static or dynamic conditions.

6. The process of claim 1, wherein the temperature in step (ii) is in the range of 100 to 200° C.

7. The process of claim 1, wherein the crystallization time in step (ii) is in the range from 6 hours to 50 days.

8. The process of claim 1, wherein crystals of a CHA zeolite or zeotype are added as seeds, in quantities up to 25% by weight with respect to the total amount of oxides in the synthesis mixture before or during the crystallization of Cu-SAPO-34.

9. The process of claim 1, wherein the elimination of OSDA 1and OSDA2 in step (iv) from the crystalline material is performed by extraction and/or thermal treatment at temperatures above 25° C., during a period of time between 2 minutes and 25 hours.

10. The process of claim 1, wherein the pH value of the synthesis mixture is below 9.

* * * * *